United States Patent
Liao et al.

(10) Patent No.: US 9,225,862 B2
(45) Date of Patent: Dec. 29, 2015

(54) BUFFER STRUCTURE AND OFFICE MACHINE

(71) Applicant: Kinpo Electronics, Inc., New Taipei (TW)

(72) Inventors: Chin-Chuo Liao, New Taipei (TW); Chia-Wu Liao, New Taipei (TW)

(73) Assignee: Kinpo Electronics, Inc., New Taipei (TW)

( * ) Notice: Subject to any disclaimer, the term of this patent is extended or adjusted under 35 U.S.C. 154(b) by 29 days.

(21) Appl. No.: 14/156,471

(22) Filed: Jan. 16, 2014

(65) Prior Publication Data
US 2015/0172490 A1    Jun. 18, 2015

(30) Foreign Application Priority Data
Dec. 12, 2013  (TW) .............................. 102145920 A (51) Int. Cl.
*G03G 21/16* (2006.01)
*H04N 1/00* (2006.01)
*B41J 29/02* (2006.01)

(52) U.S. Cl.
CPC .............. *H04N 1/00551* (2013.01); *B41J 29/02* (2013.01); *G03G 21/1633* (2013.01)

(58) Field of Classification Search
CPC .......... G03G 21/1842; G03G 21/1633; G03G 21/1619; G03G 21/1661; G03G 15/60; G03G 2215/00544
USPC ............................ 399/107, 393; 271/145, 171
See application file for complete search history.

(56) References Cited

U.S. PATENT DOCUMENTS

| | | | |
|---|---|---|---|
| 2006/0088336 A1* | 4/2006 | Hirose et al. ................. | 399/110 |
| 2006/0099007 A1* | 5/2006 | Uchida ......................... | 399/107 |
| 2013/0147110 A1 | 6/2013 | Liao | |

FOREIGN PATENT DOCUMENTS

| | | |
|---|---|---|
| TW | 310665 | 7/1997 |
| TW | M401539 | 4/2011 |
| TW | I388437 | 3/2013 |
| TW | 201325922 | 7/2013 |

* cited by examiner

*Primary Examiner* — Walter L Lindsay, Jr.
*Assistant Examiner* — Jessica L Eley
(74) *Attorney, Agent, or Firm* — Jianq Chyun IP Office (57) ABSTRACT

A buffer structure is configured to an office machine including a base and a cover pivotally connected to the base provided. The buffer structure includes a first engaging portion fixed to the cover, a rotation member and an elastic member. The rotation member includes a rotation shaft pivotally connected to the base, a second engaging portion located on a rotation path of the first engaging portion, and a fixing portion. The elastic member includes a first end and a second end opposite to each other. The first end and the second end are fixed to the base and the fixing portion. When the cover rotates toward the base, the first engaging portion is engaged to the second engaging portion to drive the rotation member to rotate along a first clock direction, and the elastic member is deformed to exert a moment to the rotation member along a second clock direction.

10 Claims, 6 Drawing Sheets

BUFFER STRUCTURE AND OFFICE MACHINE

CROSS-REFERENCE TO RELATED APPLICATION

This application claims the priority benefit of Taiwan application serial no. 102145920, filed on Dec. 12, 2013. The entirety of the above-mentioned patent application is hereby incorporated by reference herein and made a part of this specification.

BACKGROUND

1. Technical Field

The invention relates to a buffer structure and an office machine. Particularly, the invention relates to a buffer structure capable of slowing down a descending speed of a cover and an office machine using the buffer structure.

2. Related Art

Along with progress of technology, multi-function printers (MFP) integrating a copy function and a scan function have been developed in the market to facilitate users to perform word processing tasks. When the MFP is used, a cover thereof is generally required to be opened or closed to a based, and since the cover has a certain weight, when the cover is closed downwards to the base, due to a fast descending speed of the cover, the user's finger has a risk of being pinched due to lack of a response time, or the cover probably hits the base hard to damage components of the MFP.

SUMMARY

The invention is directed to a buffer structure, which is capable of slowing down a speed of closing a cover to a base, so as to decrease a chance of pinching a user or damaging members of an office machine due to impact.

The invention is directed to an office machine having a buffer structure.

According to one exemplary embodiment of the instant disclosure, a buffer structure is configured to an office machine including a base and a cover pivotally connected to the base. The buffer structure includes a first engaging portion, a rotation member and an elastic member. The first engaging portion is fixed to the cover. The rotation member includes a rotation shaft, a second engaging portion corresponding to the first engaging portion and a fixing portion. The rotation shaft is pivotally connected to the base, and the second engaging portion is located on a rotation path of the first engaging portion. The elastic member includes a first end and a second end opposite to each other, where the first end is fixed to the base, and the second end is fixed to the fixing portion. When the cover rotates towards the base, the first engaging portion is engaged to the second engaging portion to drive the rotation member to rotate along a first clock direction, and the elastic member is deformed to exert a moment to the rotation member along a second clock direction.

In an embodiment of the invention, the buffer structure further includes an arc guide slot and a guide pillar, the arc guide slot is fixed to the cover, and the guide pillar is fixed to the base and is movably disposed in the arc guide slot.

In an embodiment of the invention, a radian of the arc guide slot is the maximum rotation angle of the cover relative to the base.

In an embodiment of the invention, the rotation member further includes a position limiting portion, and before the first engaging portion contacts the second engaging portion, the elastic member has an elastic potential, and the position limiting portion contacts the base to maintain a relative position of the rotation member and the base.

In an embodiment of the invention, the first engaging portion is a hook, and the second engaging portion is a beam corresponding to the hook.

In one exemplary embodiment, an office machine includes a base, a cover and a buffer structure. The cover is pivotally connected to the base. The buffer structure includes a first engaging portion, a rotation member and an elastic member. The first engaging portion is fixed to the cover. The rotation member includes a rotation shaft, a second engaging portion corresponding to the first engaging portion and a fixing portion. The rotation shaft is pivotally connected to the base, and the second engaging portion is located on a rotation path of the first engaging portion. The elastic member includes a first end and a second end opposite to each other, where the first end is fixed to the base, and the second end is fixed to the fixing portion. When the cover rotates towards the base, the first engaging portion is engaged to the second engaging portion to drive the rotation member to rotate along a first clock direction, and the elastic member is deformed to exert a moment to the rotation member along a second clock direction.

In an embodiment of the invention, the buffer structure further includes an arc guide slot and a guide pillar, the arc guide slot is fixed to the cover, and the guide pillar is fixed to the base and is movably disposed in the arc guide slot.

In an embodiment of the invention, a radian of the arc guide slot is the maximum rotation angle of the cover relative to the base.

In an embodiment of the invention, the rotation member further includes a position limiting portion, and before the first engaging portion contacts the second engaging portion, the elastic member has an elastic potential, and the position limiting portion contacts the base to maintain a relative position of the rotation member and the base.

In an embodiment of the invention, the first engaging portion is a hook, and the second engaging portion is a beam corresponding to the hook.

According to the above descriptions, the office machine of the invention is configured with the buffer structure, and during a process of closing the cover to the base, the first engaging portion on the cover is engaged to the second engaging portion of the rotation member pivotally connected to the base, so as to drive the rotation member to rotate along the first clock direction, such that the elastic member located between the rotation member and the base is deformed. The deformed elastic member exerts a moment to the rotation member along the second clock direction, and the second engaging portion of the rotation member provides an upward pushing force to the first engaging portion to slow down a closing speed of the cover. The buffer structure of the invention may effectively avoid the cover of the office machine from pinching the user's finger due to a fast closing speed or impacting the base to damage the members of the office machine.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
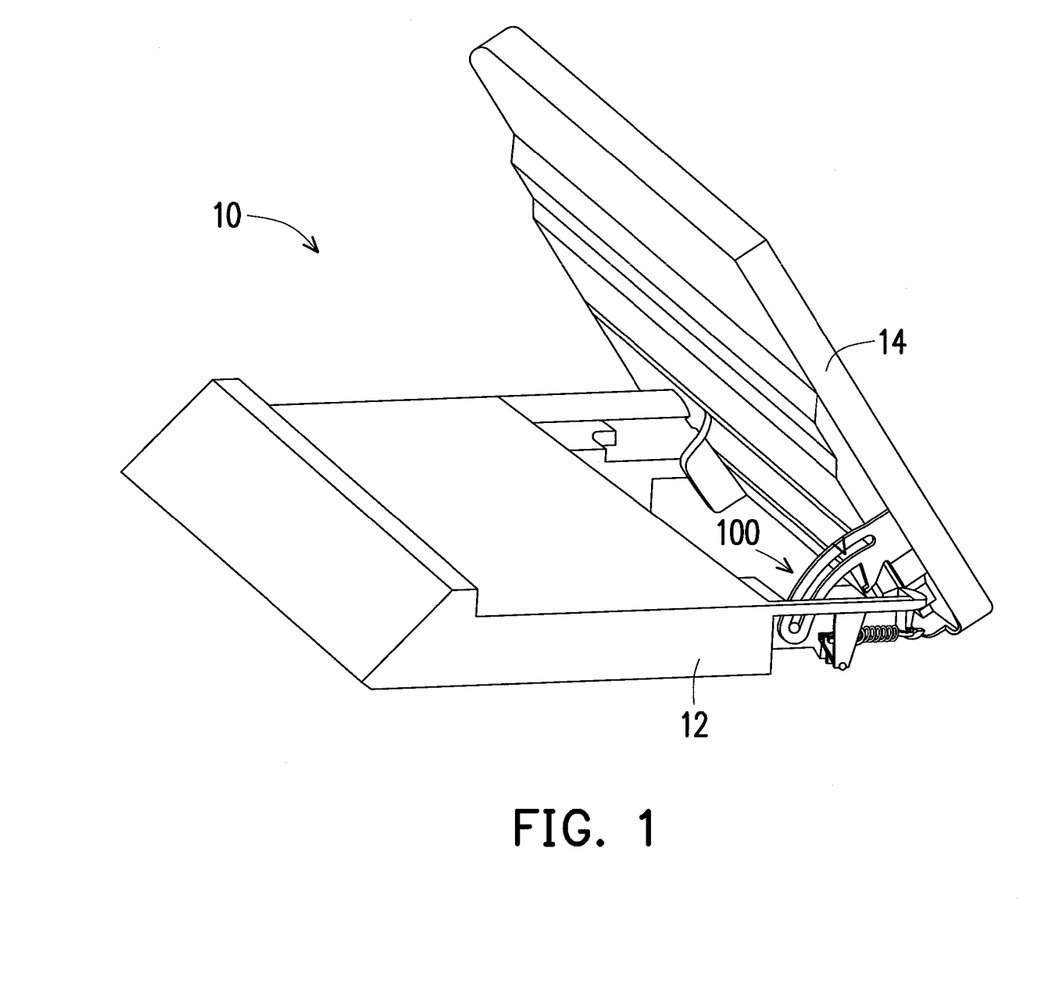
FIG. 1 is a schematic diagram of an office machine according to an embodiment of the invention.

FIG. 1 is a schematic diagram of an office machine according to an embodiment of the invention. Referring to FIG. 1, the office machine 10 of the present embodiment includes a base 12, a cover 14 and a buffer structure 100. The cover 14 is pivotally connected to the base 12, and the cover 14 can be adjustably opened or closed to the base 12. In the present embodiment, the buffer structure 100 is configured at a position close to a junction of the base 12 and the cover 14, though the configuration position of the buffer structure 100 relative to the base 12 and the cover 14 is not limited thereto. By configuring the buffer structure 100, when the cover 14 of the office machine 10 is about to be closed to the base 12 (for example, when a front edge of the cover 14 located away from the junction between the cover 14 and the base 12 descends to a position where a distance between the position and the base 12 is about 5 cm), a closing speed and a force that the cover 14 is closed to the base 12 can be effectively decreased, so as to avoid the cover 14 of the office machine 14 from pinching the user's finger due to a fast closing speed and impacting the base 12 to damage the members of the office machine 100. A relationship among the base 12, the cover 14 and the buffer structure 100 is described in detail below.

Figure 2:
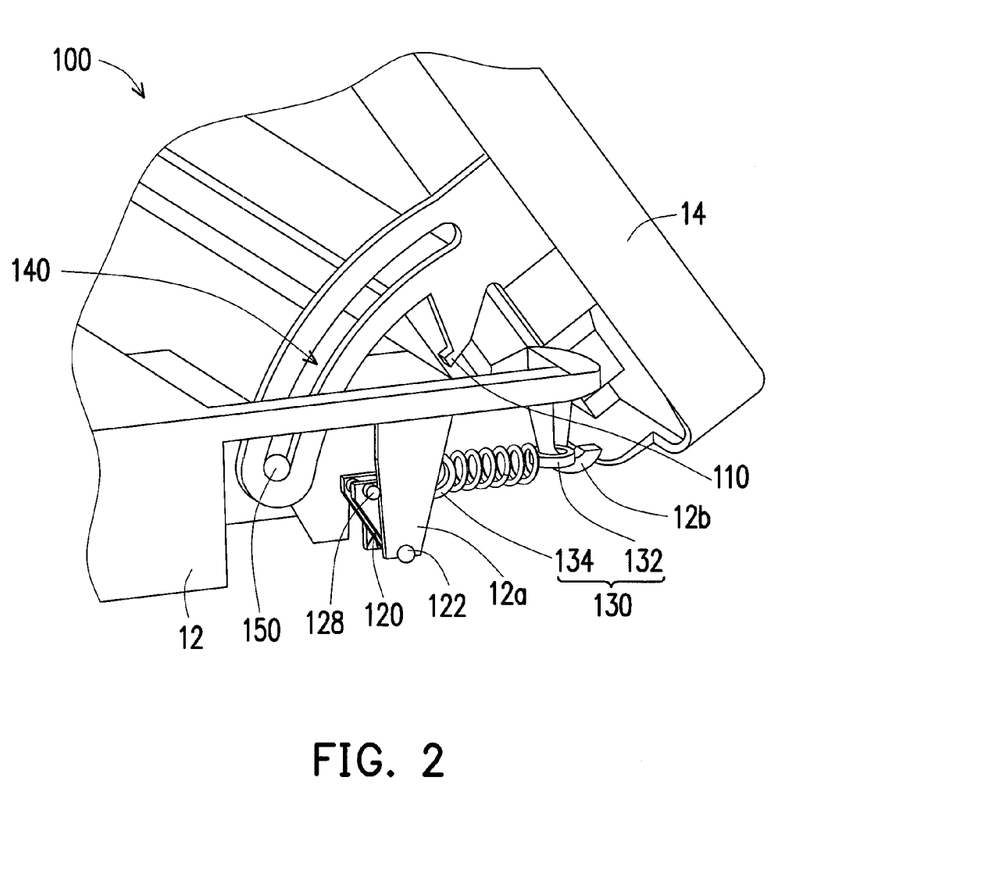
FIG. 2 is an enlarged view of a buffer structure of the office machine of FIG. 1.
Figure 3:
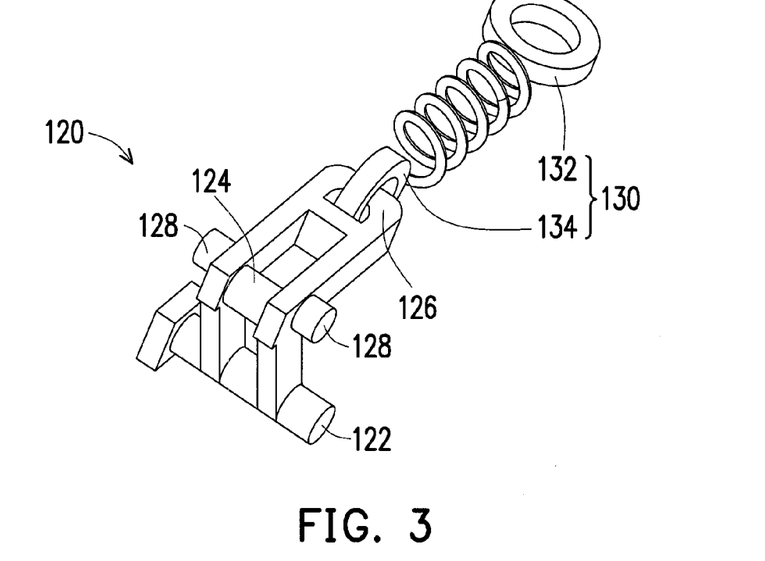
FIG. 3 is a schematic diagram of a rotation member and an elastic member of the buffer structure of FIG. 2.
Figure 4:
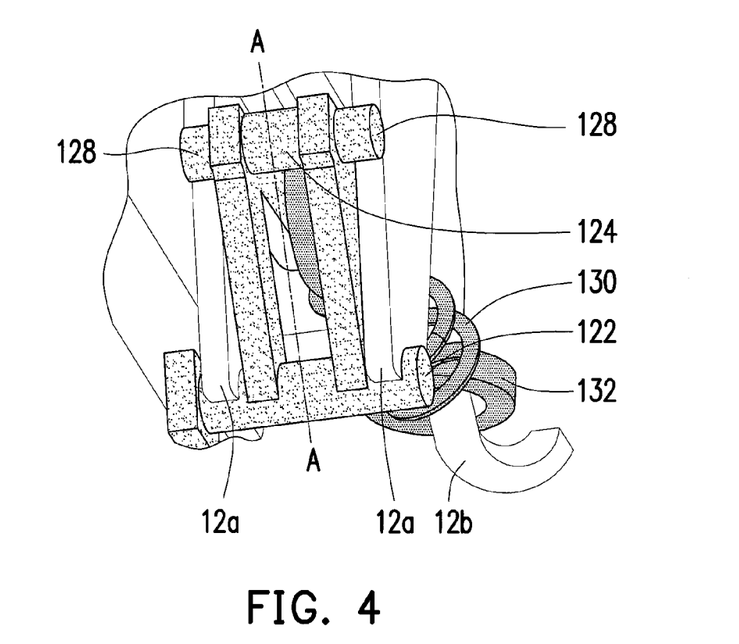
FIG. 4 is a schematic diagram of a rotation member and an elastic member of FIG. 3 configured to a base.

FIG. 2 is an enlarged view of the buffer structure of the office machine of FIG. 1. FIG. 3 is a schematic diagram of a rotation member and an elastic member of the buffer structure of FIG. 2. FIG. 4 is a schematic diagram of the rotation member and the elastic member of FIG. 3 configured to the base. Referring to FIG. 2 to FIG. 4, the buffer structure 100 of the present embodiment includes a first engaging portion 110, a rotation member 120 and an elastic member 130. The first engaging portion 110 is fixed to the cover 14.

As shown in FIG. 3, the rotation member 120 includes a rotation shaft 122, a second engaging portion 124 corresponding to the first engaging portion 110, a fixing portion 126 and at least one position limiting portion 128. In the present embodiment, the first engaging portion 110 is a hook, and the second engaging portion 124 is a beam corresponding to the hook, though in other embodiments, the first engaging portion 110 can also be a beam, and the second engaging portion 124 can be a hook. Alternatively, the first engaging portion 110 and the second engaging portion 124 can be two corresponding hooks, etc.

In the present embodiment, the base 12 includes two fixing walls 12a and a fixing hook 12b, and the rotation member 120 is pivotally disposed at the two fixing walls 12a of the base 12 through the rotation shaft 122. The elastic member 130 includes a first end 132 and a second end 134 opposite to each other. The first end 132 of the elastic member 130 is fixed to the fixing hook 12b of the base 12, and the second end 134 of the elastic member 130 is fixed to the fixing portion 126 of the rotation member 120. In the present embodiment, the elastic member 130 is a spring, though the elastic member 130 can also be other stretchable or compressible objects, and the type of the elastic member 130 is not limited thereto.

In the present embodiment, before the first engaging portion 110 contacts the second engaging portion 124 as that shown in FIG. 2, the elastic member 130 is slightly stretched and has a deformation, the stretched elastic member 130 exerts a pulling force to the rotation member 120 along a rightward direction of FIG. 2, though since the position limiting portion 128 of the rotation member 120 leans against the fixing wall 12a of the base 12 at a side away from the elastic member 130, the fixing wall 12a exerts a pushing force to the position limiting portion 128 along a leftward direction of FIG. 2 to resist the elastic force, such that the second engaging portion 124 of the rotation member 120 is maintained to a position on a rotation path of the first engaging portion 110. Certainly, in other embodiments, before the second engaging portion 124 contacts the first engaging portion 110, the elastic member 130 may also have no deformation, in this case, a manufacturer may correspondingly remove the position limiting portion 128 of the rotation member 120 according to an actual requirement.

In the present embodiment, in order to ensure a rotation path of the cover 14 relative to the base 12, the buffer structure 100 further includes arc guide slot 140 and a guide pillar 150. The arc guide slot 140 is fixed to the cover 14, and the guide pillar 150 is fixed to the base 12 and is movably disposed in the arc guide slot 140. When the cover 14 rotates relative to the base 12, the guide pillar 150 slides along an inner contour of the arc guide slot 140. In this way, it is ensured that the first engaging portion 110 on the cover 14 is engaged to the second engaging portion 124 of the rotation member 120 before the cover 14 is closed to the base 12, so as to provide a subsequent buffer effect. In the present embodiment, a radian of the arc guide slot 140 is designed to be equal to the maximum angle that the cover 14 can be opened. Namely, when the front edge of the cover 14 is opened to the farthest position relative to the base 12, the guide pillar 150 on the base 12 contacts one end of the arc guide slot 140, and when the cover 140 is closed to the base 12, the guide pillar 150 on the base 12 contacts the other end of the arc guide slot 140. Certainly, in other embodiments, the design of the arc guide slot 140 and the guide pillar 150 can be omitted, and other members can be used to maintain a constant rotation path of the cover 14.

Figure 5:
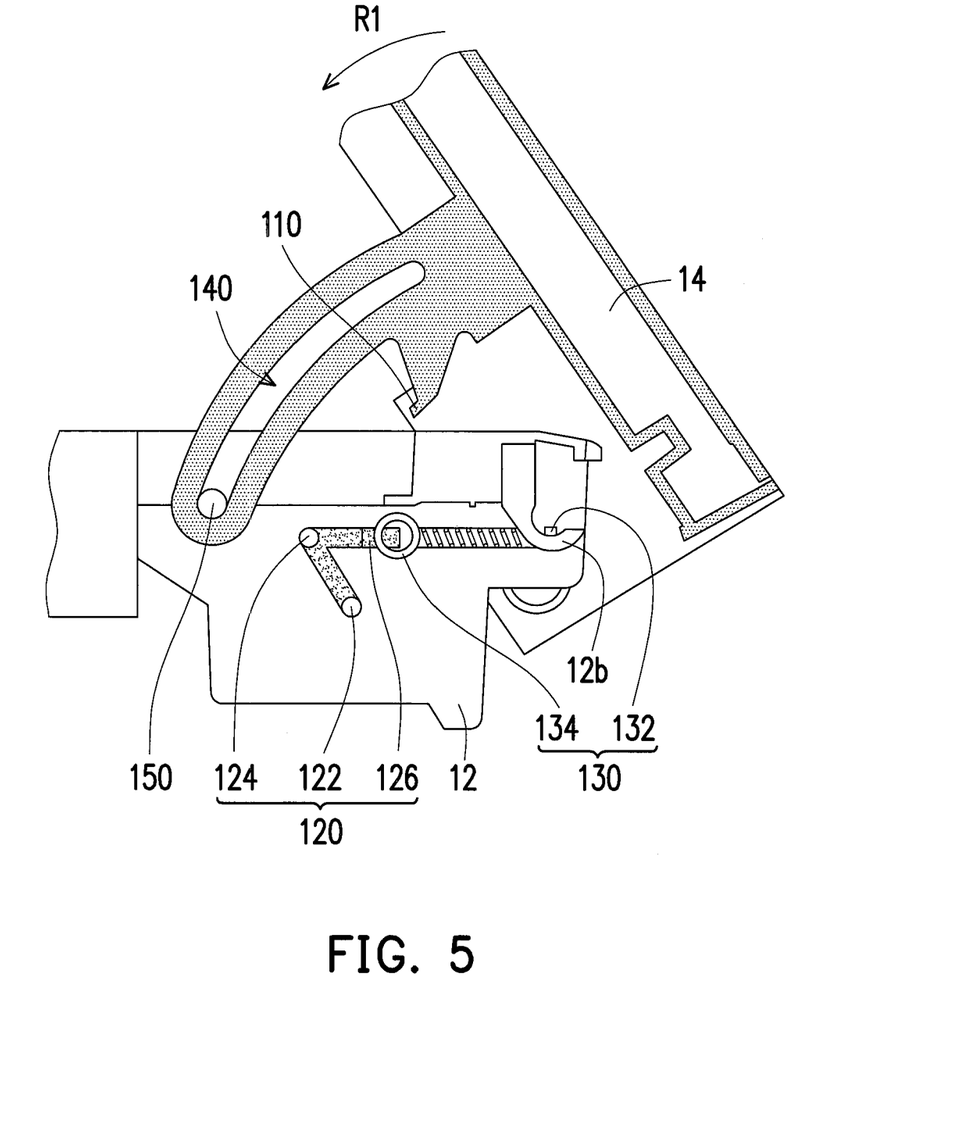
FIG. 5 is a partial cross-sectional view of the office machine of FIG. 1 with a cover unclosed to the base.
Figure 6:
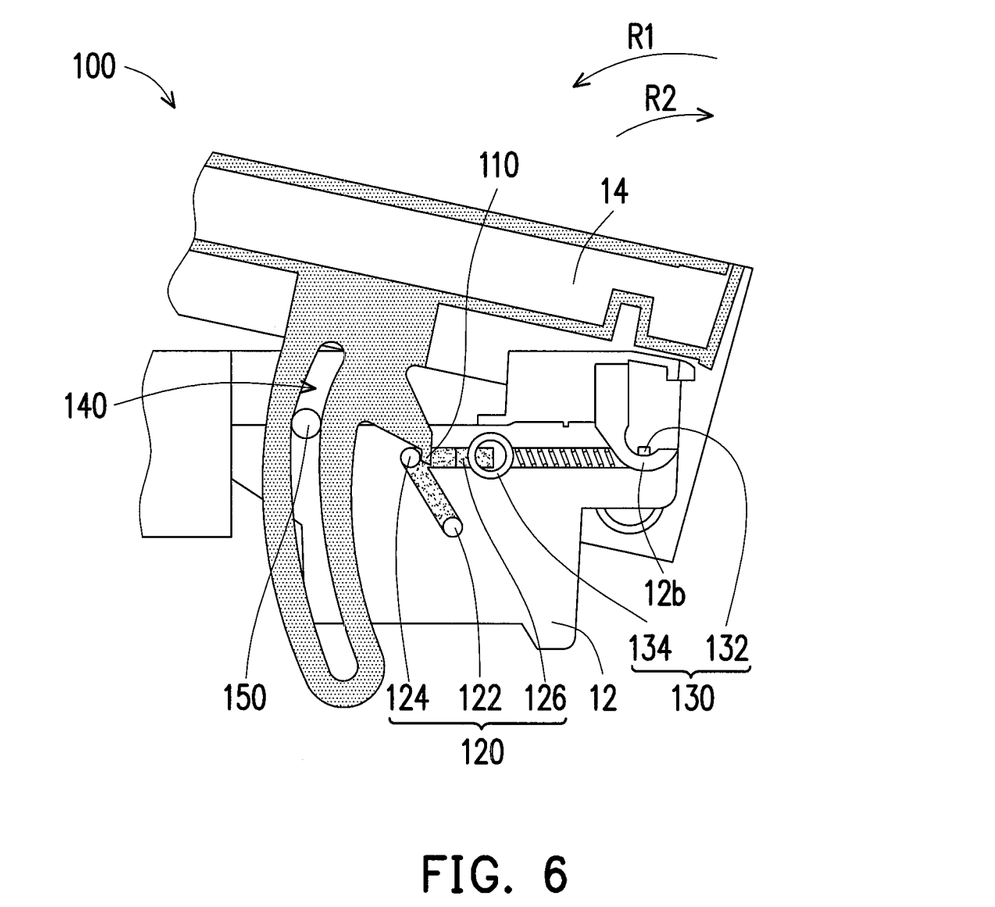
FIG. 6 is a partial cross-sectional view of the office machine of FIG. 1 with the cover approaching to the base.
Figure 7:
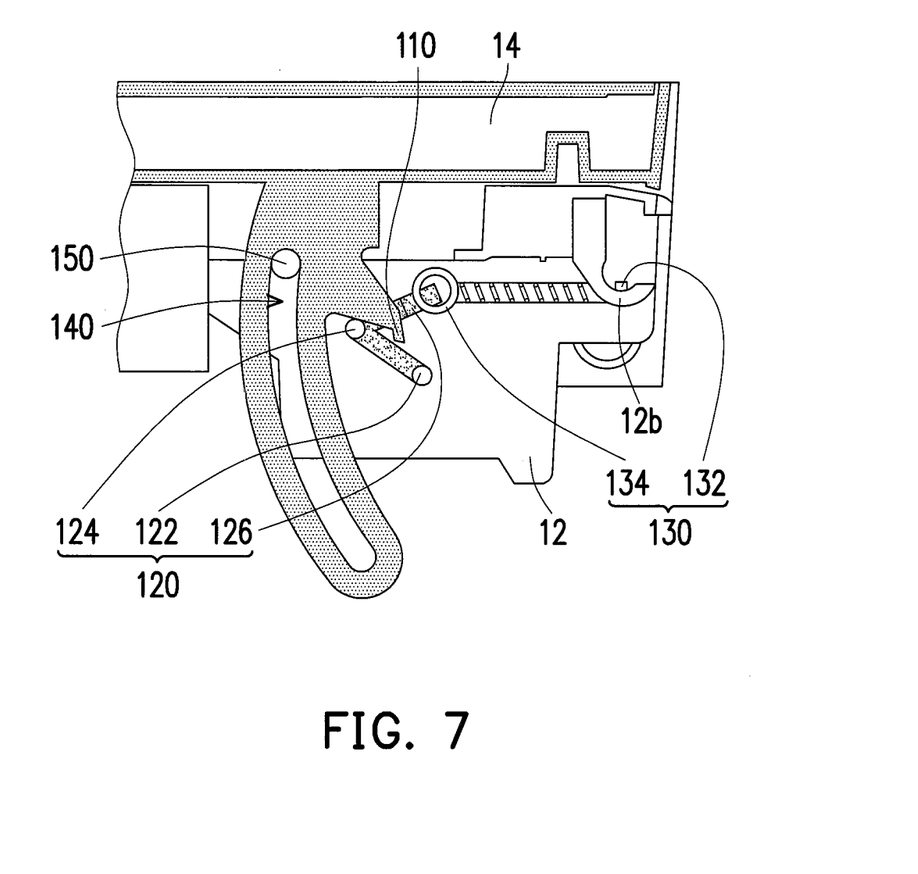
FIG. 7 is a partial cross-sectional view of the office machine of FIG. 1 with the cover closed to the base.

How the buffer structure 100 slows down the closing speed and force of the cover 14 is introduced below with reference of different positions of the cover 14 relative to the base 12. FIG. 5 is a partial cross-sectional view of the office machine of FIG. 1 with the cover unclosed to the base. FIG. 6 is a partial cross-sectional view of the office machine of FIG. 1 with the cover approaching to the base. FIG. 7 is a partial cross-sectional view of the office machine of FIG. 1 with the cover closed to the base. It should be noticed that in order to clearly illustrate an actuation relationship among the first engaging portion 110, the rotation member 120 and the elastic member 130, FIG. 5 to FIG. 7 are partial cross-sectional views of the office machine 10 viewing from an angle by cutting through the second engaging portion 124 (i.e. cutting along an A-A line shown in FIG. 4).

First, referring to FIG. 5, in FIG. 5, the cover 14 of the office machine 10 is in an opening state relative to the base 12. Now, the first engaging portion 110 is still not in contact with the second engaging portion 124. When the user wants to close the cover 14 to the base 12, the user can rotate the cover 14 along a first clock direction R1 (which is a counterclockwise direction in the present embodiment) relative to the base 12, and the cover 14 is rotated to a position close to the base 12 as that shown in FIG. 6. Now, the first engaging portion 110 on the cover 14 is engaged to the second engaging portion 124 to drive the rotation member 120. Since the rotation member 120 is pivotally disposed at the base 12 through the rotation shaft 122, when the first engaging portion 110 drives the second engaging portion 124 of the rotation member 120 to rotate along the first clock direction R1, the second engaging portion 124 and the fixing portion 126 of the rotation member 120 are rotated towards a lower left direction of FIG. 6 along the rotation shaft 122. Accordingly, the elastic member 130 is pulled by the rotation member 120 and is stretched, and the stretched elastic member 130 provides an elastic force to the rotation member 120 along a rightward direction of the figure, such that a moment for rotating the rotation member 120 along a second clock direction R2 (which is a clockwise direction of the present embodiment) is exerted to the rotation member 120. Since the second engaging portion 124 of the rotation member 120 is engaged to the first engaging portion 110 of the cover 14, the second engaging portion 124 of the rotation member 120 influenced by the elastic member 130 exerts a forward force to the first engaging portion 110 along an upper right direction of the figure to slow down the descending speed of the cover 14. Therefore, after the first engaging portion 110 contacts the second engaging portion 124, the cover 14 is closed to the base 12 in a slower speed.

In this way, a longer response time is provided to the user. Moreover, as the descending speed and force of the cover 14 are relatively small, it is not liable to pinch the user's finger. Moreover, when the cover 14 is closed to the base 12 (shown in FIG. 7), since the rotation member 120 is still pulled by the elastic member 130 to exert a continuous pushing force to the first engaging portion 110, when the user wants to open the cover 14, the user can open the cover 14 without using an excessive force, so as to avoid damaging the components of the office machine 10 due to excessive force used for opening the cover 14.

It should be noticed that a manufacturer can choose a suitable elastic member 130 according to a weight of the cover 14. Regarding the elastic member 130 of the present embodiment, the manufacturer can choose the elastic member 130 with different elastic coefficients according to an actual requirement, so that during a process that the first engaging portion 110 is engaged to the second engaging portion 124, a moment on the rotation shaft 122 of the rotation member 120 generated by the weight of the cover 114 is slightly greater than the moment on the rotation shaft 122 of the rotation member 120 generated by the elastic member 130. In this way, the cover 14 can still slowly descend to tightly close to the base 12. In addition, in the present embodiment, the office machine 10 configured with the buffer structure 100 is taken as an example for descriptions, and in other embodiments, the buffer structure 100 can also be configured to other machines having a cover and a base to decrease a force of the cover closed to the base.

In summary, the office machine of the invention is configured with the buffer structure, and during a process of closing the cover to the base, the first engaging portion on the cover is engaged to the second engaging portion of the rotation member pivotally connected to the base, so as to drive the rotation member to rotate along the first clock direction, such that the elastic member located between the rotation member and the base is deformed. The deformed elastic member exerts a moment to the rotation member along the second clock direction, and the second engaging portion of the rotation member provides an upward pushing force to the first engaging portion to slow down a closing speed of the cover. The buffer structure of the invention may effectively avoid the cover of the office machine from pinching the user's finger due to a too fast closing speed or impacting the base to damage the members of the office machine.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A buffer structure, configured to an office machine comprising a base and a cover pivotally connected to the base, the buffer structure comprising:
   a first engaging portion, fixed to the cover;
   a rotation member, comprising a rotation shaft, a second engaging portion corresponding to the first engaging portion and a fixing portion, wherein the rotation shaft is pivotally connected to the base, and the second engaging portion is located on a rotation path of the first engaging portion; and
   an elastic member, comprising a first end and a second end opposite to each other, wherein the first end is fixed to the base, and the second end is fixed to the fixing portion,
   wherein when the cover rotates towards the base, the first engaging portion is engaged to the second engaging portion to drive the rotation member to rotate along a first clock direction, and the elastic member is deformed to exert a moment to the rotation member along a second clock direction.

2. The buffer structure as claimed in claim 1, further comprising:
   an arc guide slot, fixed to the cover; and
   a guide pillar, fixed to the base and movably disposed in the arc guide slot.

3. The buffer structure as claimed in claim 2, wherein a radian of the arc guide slot is the maximum rotation angle of the cover relative to the base.

4. The buffer structure as claimed in claim 1, wherein the rotation member further comprises a position limiting portion, and before the first engaging portion contacts the second engaging portion, the elastic member has an elastic potential, and the position limiting portion contacts the base to maintain a relative position of the rotation member and the base.

5. The buffer structure as claimed in claim 1, wherein the first engaging portion is a hook, and the second engaging portion is a beam corresponding to the hook.

6. An office machine, comprising:
   a base;
   a cover, pivotally connected to the base; and
   a buffer structure, comprising:
      a first engaging portion, fixed to the cover;
      a rotation member, comprising a rotation shaft, a second engaging portion corresponding to the first engaging portion and a fixing portion, wherein the rotation shaft is pivotally connected to the base, and the second engaging portion is located on a rotation path of the first engaging portion; and
      an elastic member, comprising a first end and a second end opposite to each other, wherein the first end is fixed to the base, and the second end is fixed to the fixing portion, wherein when the cover rotates towards the base, the first engaging portion is engaged to the second engaging portion to drive the rotation member to rotate along a first clock direction, and the elastic member is deformed to exert a moment to the rotation member along a second clock direction.

7. The office machine as claimed in claim 6, wherein the buffer structure comprises:
   an arc guide slot, fixed to the cover; and
   a guide pillar, fixed to the base and movably disposed in the arc guide slot.

8. The office machine as claimed in claim 7, wherein a radian of the arc guide slot is the maximum rotation angle of the cover relative to the base.

9. The office machine as claimed in claim 6, wherein the rotation member further comprises a position limiting portion, and before the first engaging portion contacts the second engaging portion, the elastic member has an elastic potential, and the position limiting portion contacts the base to maintain a relative position of the rotation member and the base.

10. The office machine as claimed in claim 6, wherein the first engaging portion is a hook, and the second engaging portion is a beam corresponding to the hook.

\* \* \* \* \*